C. E. ZARTH.
WHEEL HUB.
APPLICATION FILED MAY 22, 1916.

1,216,040.

Patented Feb. 13, 1917.
2 SHEETS—SHEET 1.

Inventor:
Charles E. Zarth
By
Attys.

C. E. ZAITH.
WHEEL HUB.
APPLICATION FILED MAY 22, 1916.

1,216,040.

Patented Feb. 13, 1917.
2 SHEETS—SHEET 2.

Inventor:
Charles E. Zarth
By Gleeson & Gleeson
Attys.

UNITED STATES PATENT OFFICE.

CHARLES E. ZARTH, OF AURORA, ILLINOIS.

WHEEL-HUB.

1,216,040.      Specification of Letters Patent.      Patented Feb. 13, 1917.

Application filed May 22, 1916. Serial No. 99,071.

*To all whom it may concern:*

Be it known that I, CHARLES E. ZARTH, a citizen of the United States, and a resident of Aurora, county of Kane, and State of Illinois, have invented certain new and useful Improvements in Wheel-Hubs, of which the following is a specification, and which are illustrated in the accompanying drawings, forming a part thereof.

The invention appertains more particularly to the hubs of automobile wheels; its object being to provide improved means for detachably securing together the elements of the hub.

It consists of a device such as hereinafter described, and as illustrated in the accompanying drawings, in which—

Figure 1:
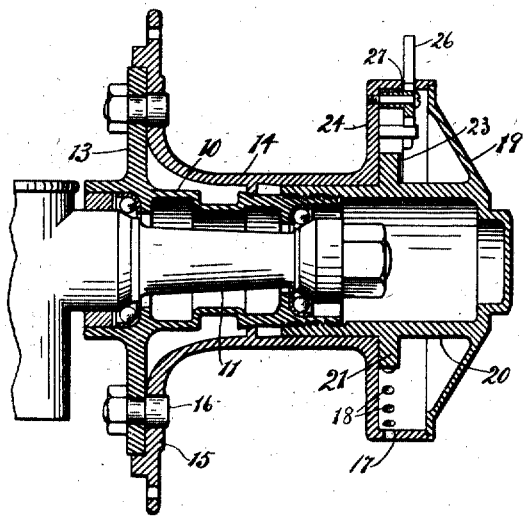
Figure 1 is a central longitudinal section of the hub fitted upon an axle.
Figure 3:
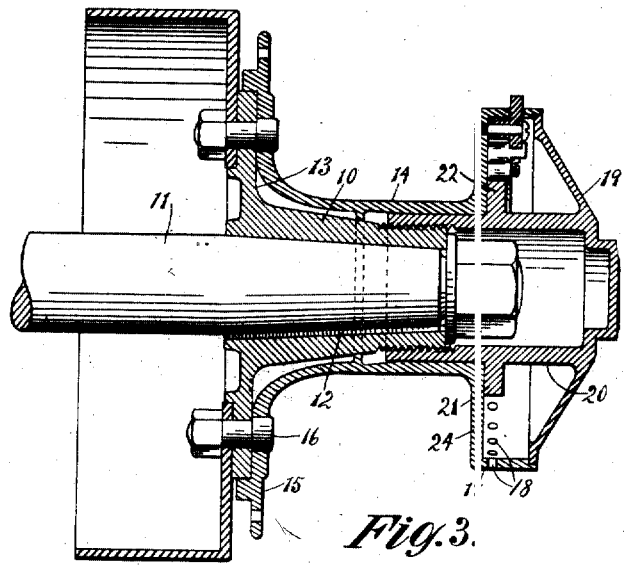
Fig. 3 is a view similar to Fig. 1, showing the hub in driving engagement with the axle.
Figure 5:
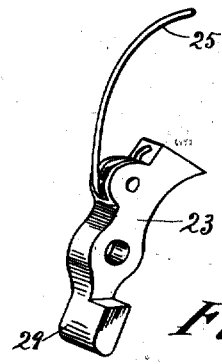
Fig. 5 is a detail of the locking latch.

The hub comprises a sleeve 10, adapted to receive the axle 11 and to be either rotatable thereon, as shown in Fig. 1, or keyed thereto, as shown at 12 in Fig. 3. The sleeve 10 is provided with a radial flange 13 at its inner end, and is externally threaded at its outer end.

A casing 14 incloses and fits upon the sleeve 10, but is spaced apart from its threaded portion. The casing is provided with a radial flange 15, adapted to engage and be secured to the flange 13 against relative rotative movement, as by means of bolts 16, the flange 15 also providing means for the attachment of the inner series of spokes in a so-called wire wheel. The outer end of the casing 14 is enlarged, as shown at 17, the periphery of the enlarged portion being provided with perforations, as 18, for the attachment of the outer series of spokes.

A cap 19 covers the open end of the casing 14, and is provided with an internally threaded tubular stem 20, adapted to engage the threaded portion of the sleeve 10. The stem 20 is provided with a radial flange 21, adapted to bear against the end of the body portion of the casing 14, the periphery of this flange being provided with ratchet teeth, as shown at 22. A latch or pawl 23, for coöperating with the ratchet teeth 22, is pivotally attached to the outstanding radial flange 24 of the enlarged outer end of the casing, and is normally held in engagement with the ratchet teeth by means of a spring 25.

A controlling lever 26, pivoted to the flange 24, engages the outer end of the pawl 23, and affords means for rocking the pawl on its pivot to disengage it from the ratchet teeth. The lever 26 projects through an aperture 27 in the periphery of the enlarged portion 17 of the casing.

The inner end of the lever 26 is provided with a cam face 28, engaging the outer end 29 of the pawl 23, and a shoulder 30 which comes into engagement with the side of the pawl when the latter is tilted out of engagement with the ratchet teeth, and thus locks the pawl in its released position.

Figure 2:
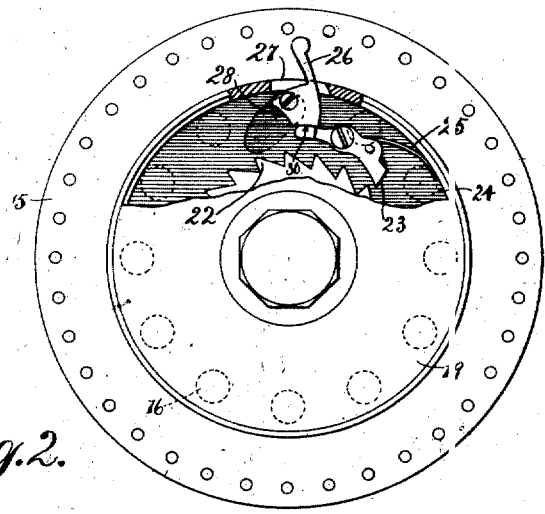
Fig. 2 is an end view of the hub, partly in section.
Figure 4:
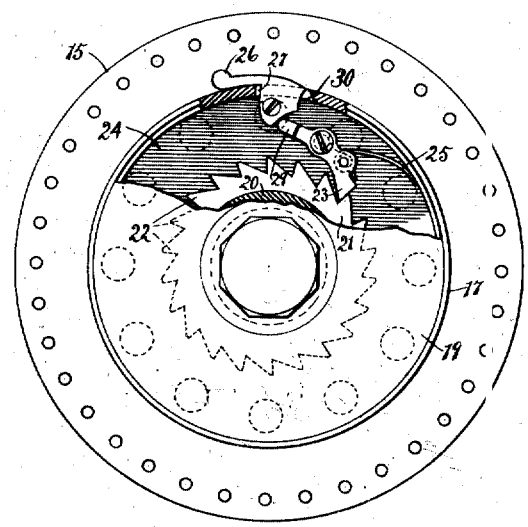
Fig. 4 is a view similar to Fig. 2, with the locking mechanism in different position.

The ratchet teeth 22 are so pitched that the cap 19 may be turned up upon the sleeve 10, the pawl clicking over the teeth. When it is desired to remove the cap, the lever 26 is manually moved from the position shown in Fig. 4 to that shown in Fig. 2, thereby disengaging the pawl from the ratchet teeth and permitting the cap to be unscrewed.

The ratchet and pawl mechanism for locking the hub cap is not of my invention; my improvement consisting in the lever device for controlling the pawl and holding it in released position. While I have shown a preferred form of construction, I do not desire to be specifically limited thereto, either as to the form and manner of mounting of the controlling lever, or as to the form of the locking mechanism for securing the hub cap.

I claim as my invention—

1. A wheel hub comprising, in combination, an axle-receiving sleeve, a casing fitting on and non-rotatable with reference to the sleeve and having its outer end enlarged, a cap for covering the outer end of the casing and being in threaded engagement with the sleeve, a spring latch mounted within the enlarged end of the casing and engageable with the cap, and a lever projecting through the periphery of the enlarged end of the casing for controlling the latch.

2. A wheel hub comprising, in combination, an axle-receiving sleeve, a casing fitting on and non-rotatable with reference to the sleeve and having its outer end enlarged, a cap for covering the outer end of the casing and being in threaded engagement with the sleeve, a spring latch mounted within the enlarged end of the casing and engageable with the cap, and a lever projecting through the periphery of the enlarged end of the casing for controlling the latch and having a shoulder for holding the latch in released position.

3. A wheel hub comprising, in combination, an axle-receiving sleeve, a casing fitting on and non-rotatable with reference to the sleeve and having its outer end enlarged, a cap for covering the outer end of the casing and being in threaded engagement with the sleeve, a spring latch mounted within the enlarged end of the casing and a lever having at its inner end a cam face adapted to tilt the latch out of engagement with the cap and a shoulder for holding the latch in disengaged position.

4. A wheel hub comprising, in combination, an axle-receiving sleeve, a casing fitting on and non-rotatable with reference to the sleeve and having its outer end enlarged, a cap for covering the outer end of the casing and being in threaded engagement with the sleeve, and having a radially toothed flange, a spring pawl engageable with the flange teeth, and a lever pivoted within the casing and projecting through its periphery and being engageable with the latch for moving it away from the teeth.

5. In a vehicle hub, in combination, an axle-receiving sleeve, a casing removably fitting on the sleeve and interlocked therewith against relative rotative movement, a cap covering the end of the casing and interlocking with the sleeve by a rotative movement, a latch for preventing relative movement of the cap and casing and mounted on one of said parts, and a radially projecting lever for actuating the latch.

CHARLES E. ZARTH.